US012633568B2

(12) United States Patent
Lu et al.

(10) Patent No.: US 12,633,568 B2
(45) Date of Patent: May 19, 2026

(54) SOLID POLYMER ELECTROLYTE INCLUDING POLYMER HAVING ETHYLENE OXIDE PORTIONS AND CARBONATE BASED PORTIONS SUPPORTED BY SUBSTRATE, AND METHOD OF PREPARING THE SAME

(71) Applicant: FORD GLOBAL TECHNOLOGIES, LLC, Dearborn, MI (US)

(72) Inventors: Zijie Lu, Novi, MI (US); Xiaojiang Wang, Saline, MI (US); Andrew Robert Drews, Ann Arbor, MI (US); Venkataramani Anandan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 552 days.

(21) Appl. No.: 17/398,419

(22) Filed: Aug. 10, 2021

(65) Prior Publication Data

US 2023/0053067 A1     Feb. 16, 2023

(51) Int. Cl.
| | |
|---|---|
| *H01M 10/0565* | (2010.01) |
| *C08K 5/315* | (2006.01) |
| *C08K 5/435* | (2006.01) |
| *H01M 10/0525* | (2010.01) |

(52) U.S. Cl.
CPC ......... *H01M 10/0565* (2013.01); *C08K 5/315* (2013.01); *C08K 5/435* (2013.01); *H01M 10/0525* (2013.01); *C08K 2201/001* (2013.01); *H01M 2300/0082* (2013.01)

(58) Field of Classification Search
CPC .......... H01M 10/0565; H01M 10/0525; C08K 5/315; C08K 5/435

USPC .......................................... 429/304, 306, 317
See application file for complete search history.

(56) References Cited

U.S. PATENT DOCUMENTS

| | | | |
|---|---|---|---|
| 5,858,264 A * | 1/1999 | Ichino | H01M 10/052 |
| | | | 204/252 |
| 2021/0066752 A1* | 3/2021 | Park | H01M 10/052 |
| 2022/0302440 A1* | 9/2022 | Jang | H01M 4/622 |

FOREIGN PATENT DOCUMENTS

| | | | | |
|---|---|---|---|---|
| CN | 1645662 A | * | 7/2005 | |
| CN | 111566866 A | * | 8/2020 | .......... H01M 10/052 |
| CN | 111786018 A | * | 10/2020 | ........ H01M 10/0525 |
| CN | 111969184 A | | 11/2020 | |
| CN | 113178617 A | * | 7/2021 | .......... H01M 10/052 |
| DE | 102017115430 A1 | | 1/2018 | |
| JP | 2003165816 A | * | 6/2003 | |
| JP | 1361241 B2 | | 11/2009 | |

(Continued)

OTHER PUBLICATIONS

Lu et al., Advanced semi-interpenetrating polymer network gel electrolyte for rechargeable lithium batteries, Nov. 2014, Electrochimica Acta, 152, 489-495 (Year: 2014).*

(Continued)

*Primary Examiner* — Sean P Cullen
(74) *Attorney, Agent, or Firm* — David B Kelley; Brooks Kushman P.C.

(57) ABSTRACT

A solid polymer electrolyte having a reinforcing substrate, a polymer having ethylene oxide portions and hydrocarbon portions with pendent functional groups having high relative permittivity for an electrochemical cell is provided. The solid polymer electrolyte may provide good ionic conductivity at room temperature and good mechanical strength.

19 Claims, 7 Drawing Sheets

(56) References Cited

FOREIGN PATENT DOCUMENTS

| | | | | | |
|---|---|---|---|---|---|
| KR | 2004020633 | A | * | 3/2004 | .......... H01M 10/052 |
| KR | 20200032842 | A | | 3/2020 | |
| KR | 2020095188 | A | * | 8/2020 | |

OTHER PUBLICATIONS

Lu et al., Elongating the cycle life of lithium metal batteries in carbonate electrolyte with gradient solid electrolyte interphase layer, Oct. 2020, Energy Storage Materials, 34, 241-249 (Year: 2020).*

Dam et al., Ion dynamics, rheology and electrochemical performance of UV cross-linked gel polymer electrolyte for Li-ion battery, Sep. 2019, Journal of Applied Physics, 126, 105104 (Year: 2019).*

* cited by examiner

100

140 140

110 130 120

SOLID POLYMER ELECTROLYTE INCLUDING POLYMER HAVING ETHYLENE OXIDE PORTIONS AND CARBONATE BASED PORTIONS SUPPORTED BY SUBSTRATE, AND METHOD OF PREPARING THE SAME

TECHNICAL FIELD

The present disclosure relates to electrolytes for electrochemical cells and more particularly to solid polymer electrolytes for lithium batteries.

BACKGROUND

Advances to reduce dependence on fossil fuels and use other energy sources are underway. However, many of these efforts require or rely on the storage of the energy sourced from the other methods. Electrochemical cells such as batteries are a primary method of storing such energy. Solid-state lithium batteries show great promise because they may be lightweight, flexible, and provide greater durability. Solid-state batteries include solid polymer electrolytes and many potential polymers have been proposed for this purpose. However, very few solid polymer electrolytes are commercially available because they may have many drawbacks such as cost, limitations on operating temperatures, limited conductivity and poor mechanical strength. For example, poly(ethylene oxide) (PEO) based solid electrolytes with small molecule lithium salts have been proposed. However, they require operational temperatures exceeding the melting temperature of PEO (e.g., greater than 60° C.) and thus have low ionic conductivity (e.g., $<10^{-5}$ S/cm) at room temperature (i.e., 25° C.). Further, high throughput methods of forming solid polymer electrolytes such as melt casting may contribute to crystallization which may further reduce ionic conductivity.

SUMMARY

An electrolyte composition includes a reinforcing substrate for supporting a polymer having ethylene oxide portions and hydrocarbon portions with polar carbonyl groups. The polymer may be saturated with a plasticizer and have lithium ions from small molecule lithium salt distributed throughout the polymer network. The electrolyte composition is configured to have an ionic conductivity of at least $10^{-3}$ mS/cm at 25° C.

A method of preparing an electrolyte composition is provided. The method includes mixing ethylene oxide monomer and alkene monomer having pendent functional groups with a relative permittivity of greater than 72 to form a first solution, mixing a plasticizer, a small molecule lithium salt, and a photoinitiator to form a second solution, mixing the first and second solution to form a final solution, applying the final solution to a reinforcing substrate, and exposing the final solution to light irradiation. Thus, providing a solid polymer electrolyte having an ionic conductivity of greater than $10^{-3}$ mS/cm.

An electrochemical cell including an anode, a cathode, and a solid polymer electrolyte therebetween is provided. The solid polymer electrolyte includes a solid polymer supported on a reinforcing or polymeric substrate and saturated by plasticizer. Lithium ions or lithium salt is dispersed within the polymer network and the polymer has poly(ethylene glycol) diacrylate based portions and vinylene carbonate based portions.

DETAILED DESCRIPTION

Figure 1:
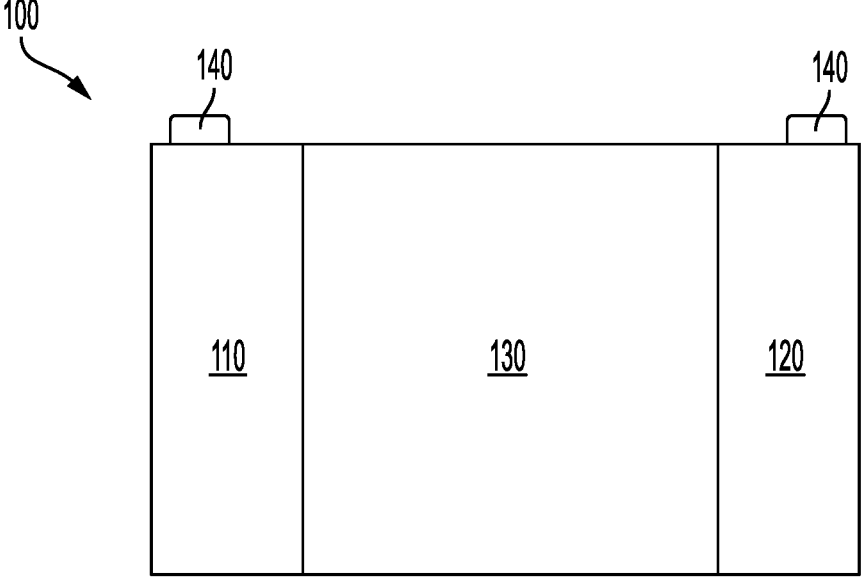
FIG. 1 is an electrochemical cell including a solid polymer electrolyte.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for given purpose implies the mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

The term "solid polymer electrolyte" is used herein to mean a polymer electrolyte that is solid at cell operating temperatures such as at room temperature (i.e., 25° C.), 40° C., or 80° C.

An electrochemical cell such as a lithium battery is provided. In FIG. 1, electrochemical cell 100 includes an anode (i.e., a negative electrode) 110, a cathode (i.e., a positive electrode) 120 and a solid polymer electrolyte 130 therebetween. The electrochemical cell may also include a current collector 140 and an additional separator between the anode 110 and cathode 120.

Figure 2:
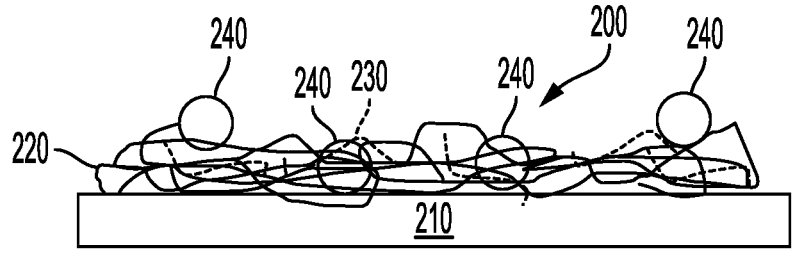
FIG. 2 is a solid polymer electrolyte.

In FIG. 2, a solid polymer electrolyte 200 is provided. The solid polymer electrolyte 200 includes a solid polymer 220 deposited on or applied to a reinforcing substrate 210, a plasticizer 230, and lithium ions sourced from a small molecule lithium salt. The reinforcing substrate may be a porous or fiber mat (e.g., any suitable fiber such as glass fiber, carbon fiber, polymeric fiber including polytetrafluoroethylene (PTFE) or expanded polytetrafluoroethylene (ePTFE)). The reinforcing substrate 210 may contribute to superior mechanical properties and strength. PTFE or ePTFE may be a suitable reinforcing substrate at thinner thickness such as less than 150 μm, or more preferably less than 100 μm, or even more preferably less than 75 μm. In a variation, the reinforcing substrate may be 1 to 150 μm, or more preferably 25 to 100 μm, or even more preferably 50 to 70 μm. However, ePTFE, for example, may require surface treatments to improve wettability or may require additional processing to inject the solid polymer electrolyte into the reinforcing substrate. Glass fiber has good wettability for the solid polymer electrolyte but may require greater overall thickness. For example, a glass fiber reinforcing substrate may be used at greater than 100 μm, or more preferably greater than 125 μm, or even more preferably greater than 150 μm may be used. In another variation, a solid polymer film of 50 to 500 μm, or more preferably 100 to 200 μm, or even more preferably 125 to 175 μm may be used. The solid polymer 220 may be saturated with or include a plasticizer 230 such as succinonitrile dispersed within it. The plasticizer may contribute to flexibility and reduce rigidity. Plasticizers such as succinonitrile may also improve ionic conductivity. Any suitable electrolyte plasticizer may be used. A lithium salt or source of lithium ions 240 such as a small molecule lithium salt may be dispersed within the polymer network. A small molecule lithium salt is used to refer to a salt with an anion size of less than 5 nm at its widest diameter, or more preferably less than 2 nm or even more preferably less than 1 nm or still further less than 0.8 nm in its desolvated state. For example, lithium bis(trifluoromethanesulfonyl)imide (LiTFSI) may be a suitable lithium salt. Other suitable salts may include but are not limited to LiPF6, LiClO4, LiBF4, or lithium bis(fluorosulfonyl)imide (LiFSI), or lithium bis(pentafluoroethanesulfonyl)imide (LiBETI).

The solid polymer 220 includes poly(ethylene oxide) (PEO) or ethylene oxide (EO) portions and hydrocarbon portions having other polar functional groups such as pendent carbonyls groups, carbonic acid groups, carbonic acid ester groups or cyclic carbonate. As such the degree of polarization can be altered by adjusting the ratio of the hydrocarbon portions having polar functional groups. Polarizability may be used to improve ionic conductivity in general and more specifically at room temperature. PEO portions may include 1 to 25, or more preferably 3 to 15, or even more preferably 6 to 8 ethylene oxide (EO) moieties. Glycols or EO containing monomers may be used to provide PEO portions. For example, poly(ethylene glycol) dimethacrylate (PEGDMA) or poly(ethylene glycol) diacrylate (PEGDA) may be used. In a refinement, the monomers may have a molecular weight of 100 to 2,000 g/mol, or more preferably 400 to 900 g/mol, or even more preferably 500 to 800 g/mol. Using monomers with greater molecular weights may increase flexibility and softness but may decrease room temperature conductivity. Conventionally, PEO based electrolytes rely solely on the coordination or interaction between lithium ions with the EO units which may be weaker than the interaction between lithium ions and other common polar groups such as water or alcohols. Further, crystallization during polymerization or processing may further weaken the interaction. In situ radical polymerization may be used to avoid crystallization, and more particularly light (e.g., UV) initiated polymerization may be used to avoid the temperature changes such as in melt casting which may facilitate crystallization. Increased polarizability also increases the interaction between the polymer chains and lithium ions thus improving ionic conductivity. Additional polar groups may be provided by polymerizing alkenes monomers containing polar functional groups such as vinylene carbonate and/or maleic acid. In a refinement, alkene monomers containing a polar functional group with a relative permittivity (ε) greater than 30, or more preferably greater than 72, or even more preferably greater than 125 as measured by ASTM D3380 may be suitable. The solid polymer may be configured to include additional polar groups such that it provides superior ionic conductivity such as greater than $10^{-5}$ S/cm, or more preferably greater than $10^{-4}$ S/cm, or even more preferably greater than $10^{-3}$ S/cm at room temperature (i.e., 25° C.). The solid polymer electrolytes may have greater conductivity at higher temperature such as greater than $10^{-5}$ S/cm, or more preferably greater than $10^{-4}$ S/cm, or even more preferably $10^{-3}$ S/cm at 70° C. In a variation, incorporating up to 5% of the hydrocarbon containing a polar functional group, or more preferably up to 9% or even more preferably up to 21% by weight of the electrolyte polymer. Unless indicated otherwise, percent by weight refers to the total aggregate weight of the polymer, the lithium salt, and plasticizer but does not include the weight of the reinforcing or polymeric substrate. In a refinement, the hydrocarbon containing polar functional group portions may be included at 1 to 40% or more preferably 5 to 25% or even more preferably 9 to 21% by weight. The mass ratio of ethylene oxide portions to hydrocarbon portions containing polar functional groups is from about 0.5:1 to 5:1, more preferably from 0.75:1 to 2.5:1, or even more preferably from 1:1 to 3:1. For example, the mass ratio may be 2.3:1 or in a refinement 1.5:1.

Figure 3:
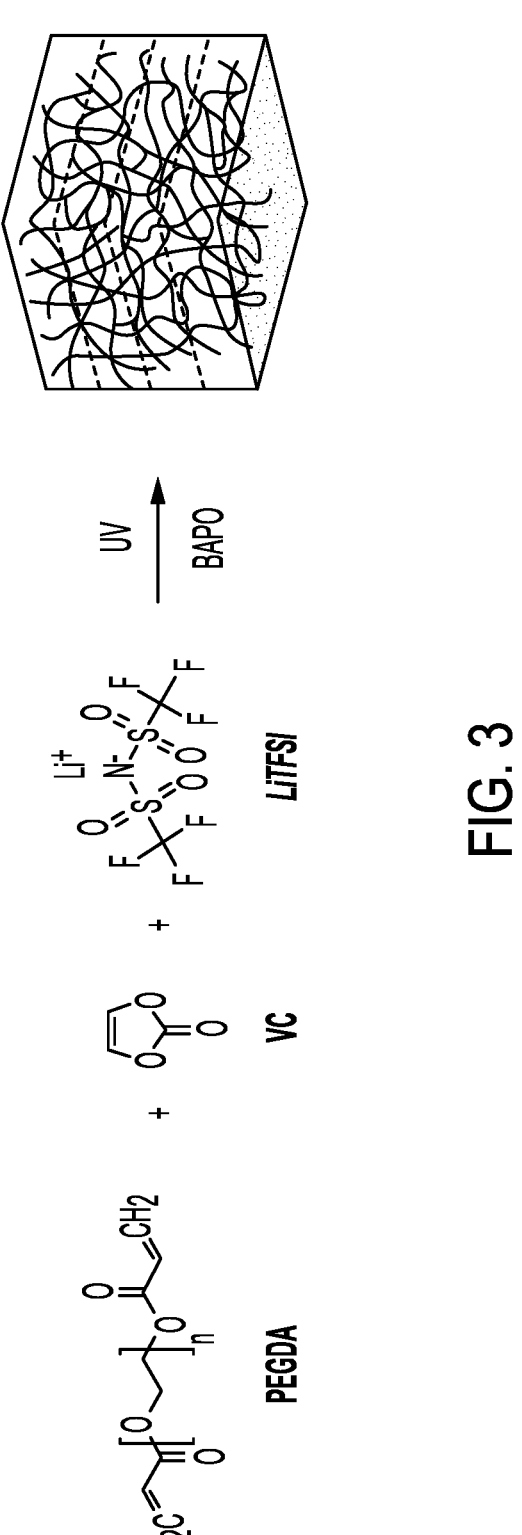
FIG. 3 is schematic showing polymerization of the monomers for forming a solid polymer for a solid polymer electrolyte.

FIG. 3 provides a monomeric reaction for forming a suitable solid polymer of the solid polymer electrolyte. The monomers (i.e., PEO monomers and alkene monomers containing functional groups) may be added and mixed together to form a first solution. The first solution may be mixed at room temperature. A second solution may be made by mixing the plasticizer, small molecule lithium salt and a photoinitiator such as phosphine oxide, phenyl bis(2,4,6-trimethylbenzoyl) or bis-acylphosphine oxide (BAPO). Other suitable photoinitiators may include but are not limited to 1-hydroxycyclohexylpheny ketone (HCPK), 2-hydroxy-2-methyl-1-phenyl-1-propanone (HMPP), or diphenyl (2,4,6-trimethylbenzoyl)-phosphine oxide (TPO). An elevated temperature such as 65° C. may be necessary or assist in dispersing and/or dissolving the salt and initiator in the plasticizer but any suitable temperature for forming the second solution may be used. If heat is added it may not initiate the initiator at this stage. Depending on the specific initiator used it may be necessary to protect the solution from light such as by using a dark or brown mixing container and/or shielding with a reflective material such as metal foil. The first solution may then be added to the second solution and mixed at an elevated temperature such as at 65° C. to form a final solution. The method is not particularly limited to adding the first solution to the second solution except that the protection from light may be maintained in the final mixing stages. The final solution may be applied to a non-adhering (non-stick) surface or applied to the reinforced substrate and then exposed to an appropriate wavelength irradiance such as UV or near-UV light for a predetermined amount of time. For example, a solution applied at 50 to 250 μm or more preferably 100 to 150 μm or even more preferably at 125 to 130 μm may be exposed to 365 to 405 nm light for at least 10 minutes. When applied to a non-adhering surface, the cured solid polymer may be removed and used in an electrochemical cell. When applied to the reinforcing substrate before curing into a solid polymer the resulting solid polymer electrolyte may be used in an electrochemical cell.

Electrolyte compositions may be prepared as shown in Table 1.

TABLE 1

| Portion | Exemplary Monomer | 1 (wt. %) | 2 (wt. %) | 3 (wt. %) |
|---|---|---|---|---|
| Ethylene oxide portion | PEGDA | 1-80 | 5-65 | 10-55 |
| Hydrocarbon portion having polar functional groups | vinylene carbonate | 1-50 | 3-30 | 5-25 |
| Small molecule lithium salt | LiTFSI | 5-70 | 15-55 | 25-45 |
| Plasticizer | succinonitrile | 1-70 | 10-60 | 20-50 |

The following examples in Table 2 were prepared following the method as provided above.

TABLE 2

| Example | Ethylene Oxide | Polar Monomer | Salt | Succinonitrile | Reinforcing/ polymeric substrate |
|---|---|---|---|---|---|
| 1a | 63% by wt. PEO$_{600}$ | — | 27% by wt. LiTFSI | — | — |
| 1b | 75% by wt. PEO (EO: Li = 20:1) | — | 25% by wt. LiTFSI | — | — |
| 2 | 35% by wt. PEGDA$_{575}$ | — | 30% by wt. LiTFSI | 35% by wt. | — |
| 3 | 49% by wt. PEGDA$_{575}$ | 21% by wt. VC | 30% by wt. LiTFSI | — | — |
| 4 | 42% by wt. PEGDA$_{575}$ | 18% by wt. VC | 40% by wt. LiTFSI | — | — |
| 5 | 24.5% by wt. PEGDA$_{575}$ | 10.5% by wt. VC | 30% by wt. LiTFSI | 35% by wt. | — |
| 6 | 21% by wt. PEGDA$_{575}$ | 9% by wt. VC | 40% by wt. LiTFSI | 30% by wt. | — |
| 7 | 21% by wt. PEGDA$_{575}$ | 9% by wt. VC | 40% by wt. LiTFSI | 30% by wt. | ePTFE |
| 8 | 15% by wt. PEGDA$_{575}$ | 10% by wt. VC | 40% by wt. LiTFSI | 35% by wt. | glass fiber |
| 9 | 28% by wt. PEGDA$_{700}$ | 12% by wt. VC | 30% by wt. LiTFSI | 30% by wt. | glass fiber |
| 10 | 21% by wt. PEGDA$_{700}$ | 9% by wt. VC | 40% by wt. LiTFSI | 30% by wt. | glass fiber |
| 11 | 14% by wt. PEGDA$_{700}$ | 6% by wt. VC | 40% by wt. LiTFSI | 40% by wt. | glass fiber |

TABLE 2-continued

| Example | Ethylene Oxide | Polar Monomer | Salt | Succinonitrile | Reinforcing/ polymeric substrate |
|---------|----------------|---------------|------|----------------|----------------------------------|
| 12 | 21% by wt. PEGDA$_{575}$ | 9% by wt. VC | 40% by wt. LiTFSI | 30% by wt. | glass fiber |
| 13 | 21% by wt. PEGDA$_{575}$ | 9% by wt. VC | 40% by wt. LiTFSI | 30% by wt. | ePTFE |
| 14 | 34% by wt. PEGDMA$_{500}$ | 40% by wt. VC | 12% by wt. LiTFSI | 14% by wt. | glass fiber |
| 15 | 34% by wt. PEGDMA$_{500}$ | 40% by wt. MA | 12% by wt. LiTFSI | 14% by wt. | glass fiber |

Examples 1 and 2 are comparative examples of a conventional PEO based electrolyte and a plasticized PEO based electrolyte. Examples 3 and 4 represent solid polymers without plasticizer. Examples 5 and 6 represent solid polymers with plasticizer and examples 7 and 8 represent solid polymer electrolytes including an embodiment of the solid polymer described herein with plasticizer and a reinforcing substrate. Results for the examples are provided below in Table 2. Examples 9 through 11 represent the effect of changing the molecular weight of a monomer. Examples 12 and 13 shows the effects of using a different reinforcing substrate. Example 14 uses a different ethylene oxide containing monomer and example 15 incorporates a different monomer containing polar groups.

Additional testing is provided for examples 9 through 11 as shown in Table 4.

TABLE 4

| Example | Conductivity at 70° C. (S/cm) | $E_a$ at 60° C. (kJ/mol) | $R_i$ of Li/ SPE interface (Ohm.cm$^2$) | $T_g$ at 25° C. |
|---------|-------------------------------|---------------------------|------------------------------------------|------------------|
| 1a | $7.00 \times 10^{-4}$ | 38.76 | 350 | −41 |
| 9 | $1.14 \times 10^{-3}$ | 29.6 | 105 | −69 |
| 10 | $2.54 \times 10^{-3}$ | 34.43 | 90 | −62 |
| 11 | $4.11 \times 10^{-3}$ | 26.45 | 70 | <−80 |

TABLE 3

| Example | Conductivity at RT (S/cm) | Electrochemical Window (V) | Li$^+$ Transference | CCD (mA/cm$^2$) | Visual Observation/thickness |
|---------|---------------------------|----------------------------|---------------------|------------------|------------------------------|
| 1a | $6.25 \times 10^{-6}$ | — | — | — | Self-standing membrane; 200 μm |
| 1b | $5.00 \times 10^{-6}$ | 5.5 | 0.2 | — | 150 μm |
| 2 | $5.16 \times 10^{-5}$ | 4.6-4.8 | — | — | Clear membrane; 350 μm |
| 3 | $5.24 \times 10^{-5}$ | 4.6-4.8 | — | — | Strong membrane; light yellow color, 350 μm |
| 4 | $8.53 \times 10^{-5}$ | 4.6-4.8 | — | — | Strong membrane; light yellow color, 300 μm |
| 5 | $5.98 \times 10^{-4}$ | 4.6-4.8 | — | 0.2 | Strong membrane; light yellow color, 145 μm |
| 6 | $4.69 \times 10^{-4}$ | 4.6-4.8 | 0.33 | 0.2 | Clear membrane; 145 μm |
| 7 | $2.27 \times 10^{-4}$ | 4.6-4.8 | — | — | Flexible membrane; 150 μm |
| 8 | $5.64 \times 10^{-4}$ | 4.6-4.8 | — | >0.5 | Tacky membrane; 250 μm |
| 9 | $2.30 \times 10^{-4}$ | 5.0 | 0.33 | 0.25 | 150 μm |
| 10 | $3.60 \times 10^{-4}$ | 4.9 | 0.35 | 0.25 | 150 μm |
| 11 | $9.70 \times 10^{-4}$ | 4.7 | 0.45 | 0.5 | 150 μm |
| 12 | $1.80 \times 10^{-4}$ | 4.8 | 0.38 | — | 150 μm |
| 13 | $2.30 \times 10^{-4}$ | 4.7 | 0.23 | — | 60 μm |
| 14 | $1.60 \times 10^{-4}$ | 4.7 | 0.38 | — | 150 μm |
| 15 | $0.80 \times 10^{-4}$ | 4.7 | 0.38 | | 150 μm |

Figure 4A:
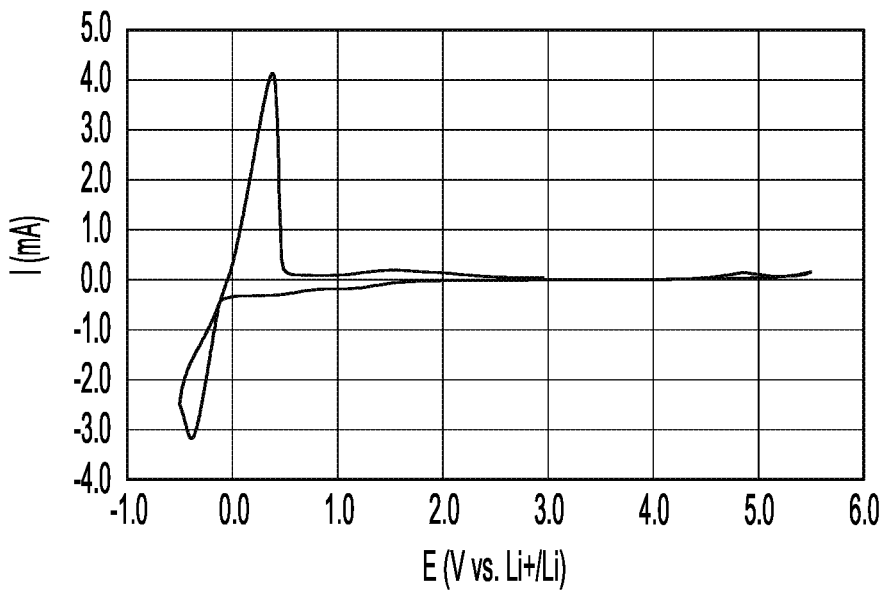
FIG. 4A is a cyclic voltammetry (CV) analysis and FIG. 4B is linear sweep voltammetry (LSV) analysis for a solid polymer electrolyte.
Figure 4B:
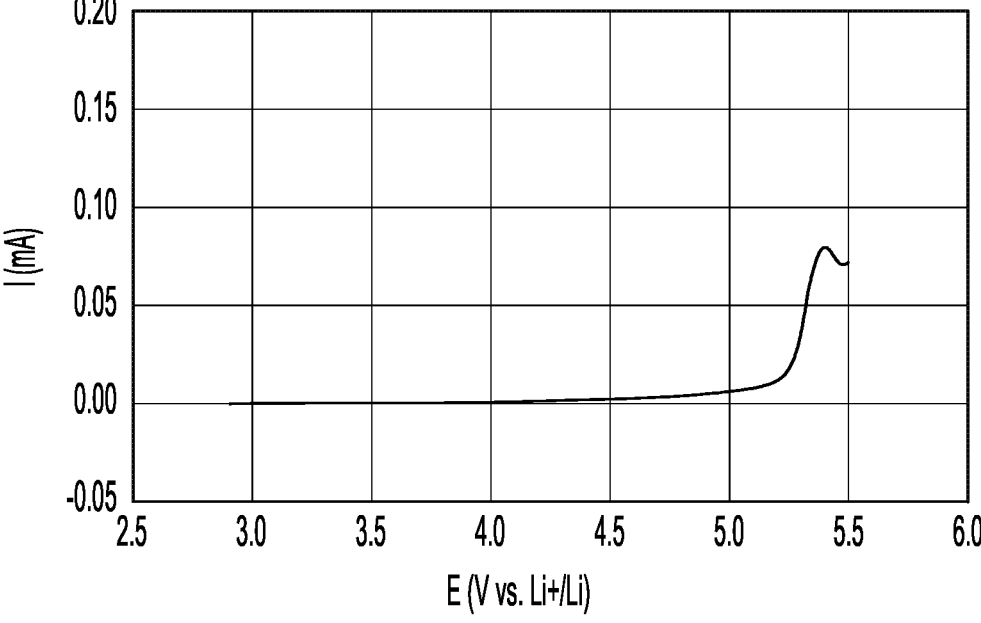
Figure 5:
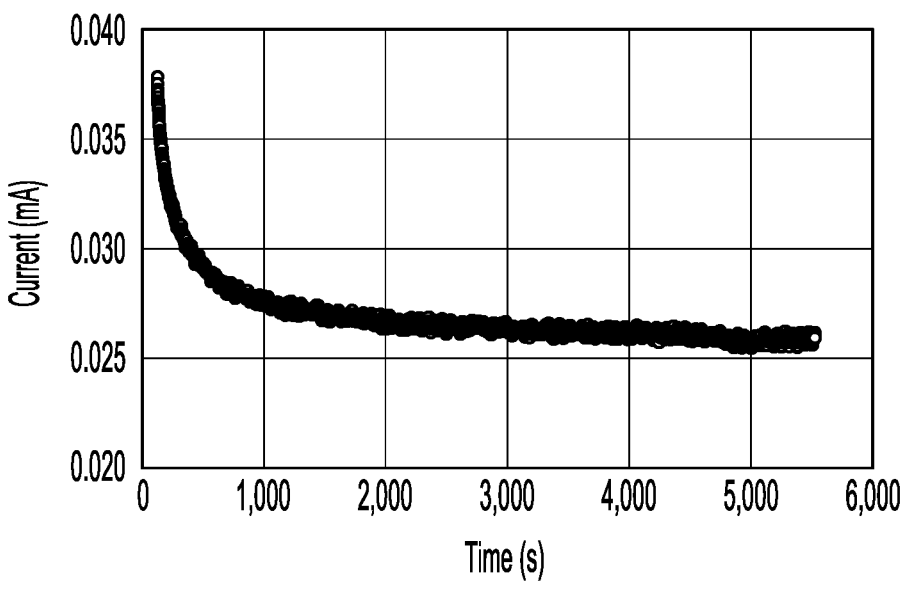
FIG. 5 is a lithium transference analysis of a solid polymer electrolyte.
Figure 6:
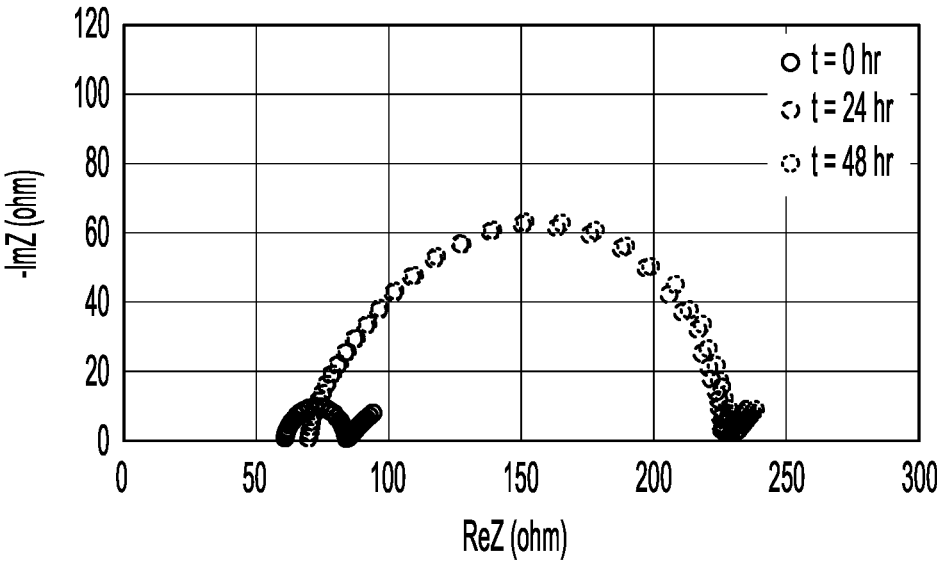
FIG. 6 is interfacial resistance analysis between lithium and a solid polymer electrolyte.
Figure 7:
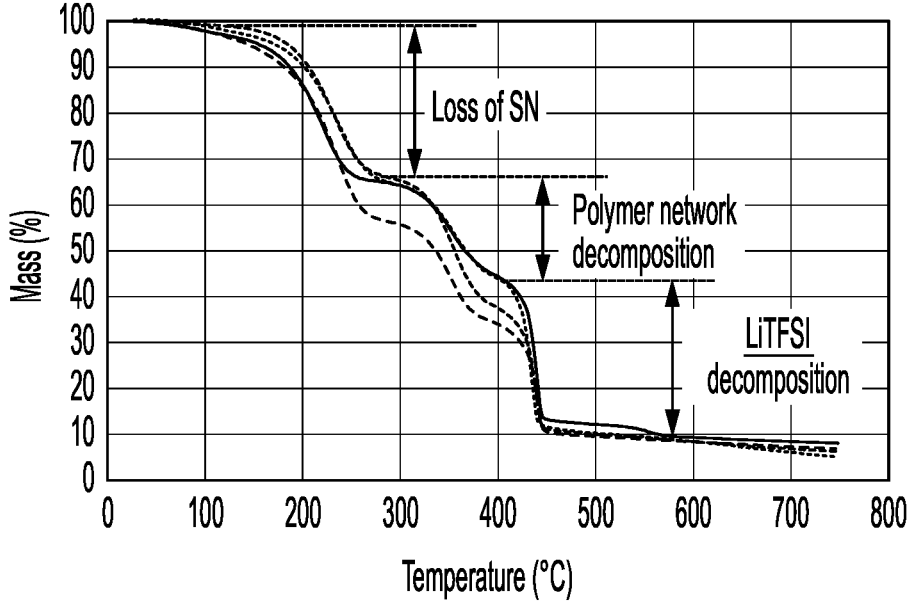
FIG. 7 is thermal gravitational analysis of a solid polymer electrolyte.
Figure 8A:
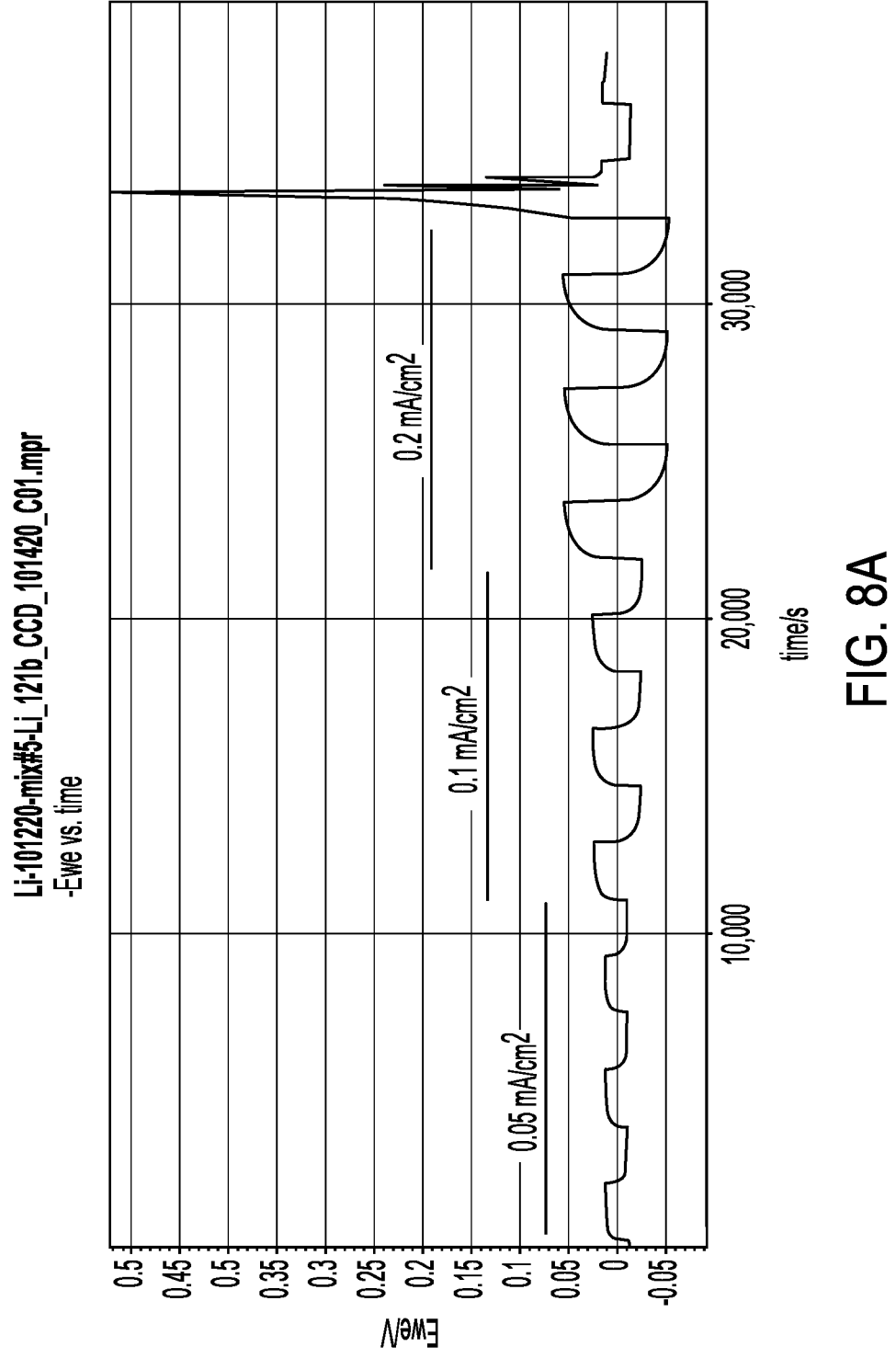
FIGS. 8A and 8B are critical current density graphs for a solid polymer and a solid polymer electrolyte.
Figure 8B:
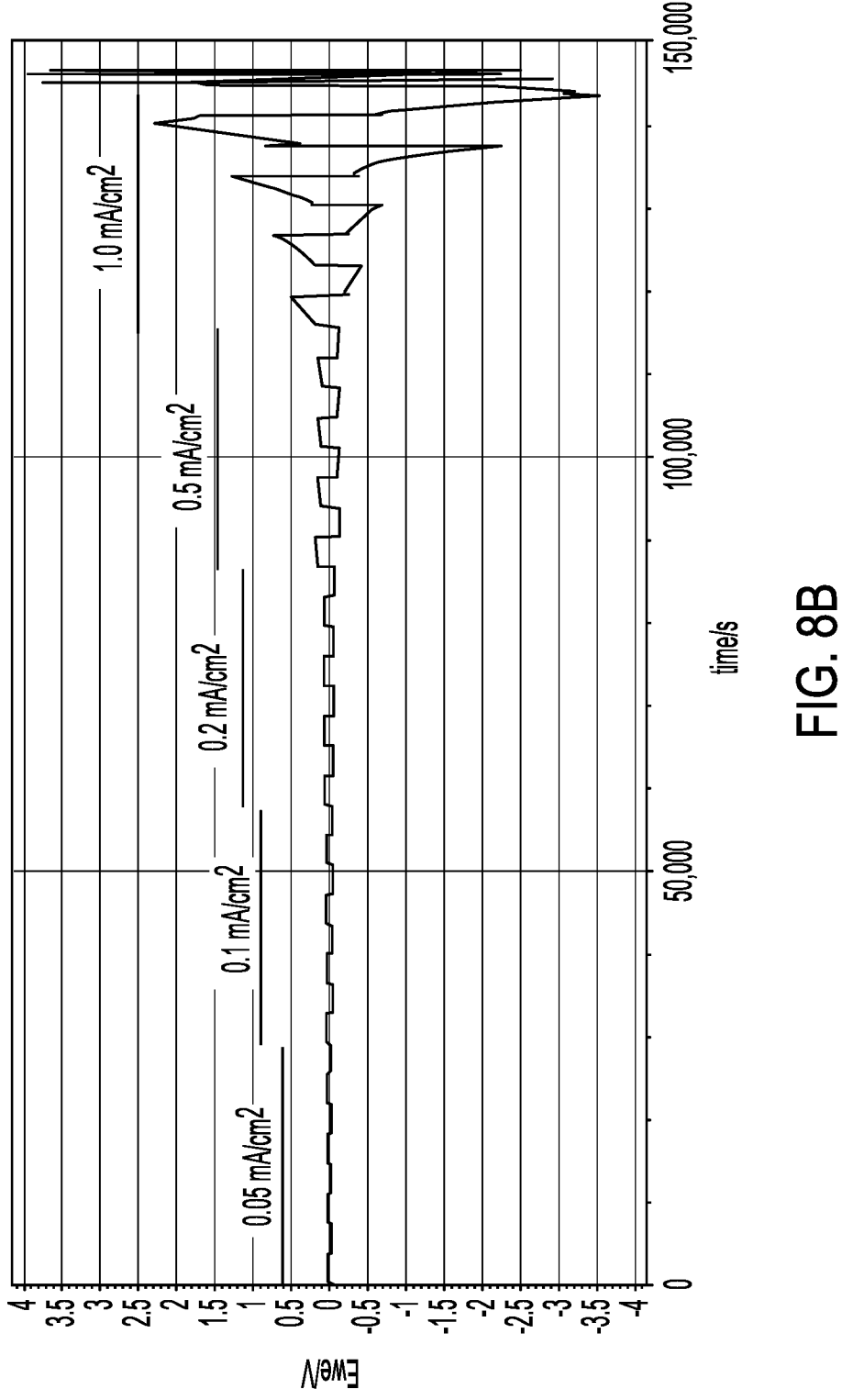

As shown in table 3 the suitable electrochemical window (i.e., 4.6-4.8) was determined by cyclic voltammetry and linear sweep voltammetry analysis as shown in FIGS. 4A and 4B. The lithium ion transference was 0.33 as shown in FIG. 5, which is similar to conventional PEO based solid polymer electrolytes. A small stable interfacial resistance between lithium and the solid polymer electrolytes disclosed herein was witnessed as shown in FIG. 6. The thermal analysis (TGA) of the solid polymer electrolytes described herein was conducted. Thermal stability was witnessed up to 150° C. Between 150 and 250° C. the plasticizer was lost and between 250 and 400° C. polymer decomposition was witnessed as shown in FIG. 7. The current density for examples 5 and 6 was low due to a suspected tear in the polymer film as shown in FIG. 8A but this was improved to greater than 0.5 mA/cm$^2$ when a reinforced substrate was used as shown in FIG. 8B.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of preparing an electrolyte composition comprising:

mixing an ethylene oxide monomer having a molecular weight of 500 to 800 g/mol in an amount of 10 to 55% by weight of the composition and alkene monomer containing pendent functional groups having a relative permittivity of greater than 72 in an amount of 1 to 40% by weight of the composition to form a first solution;

mixing a plasticizer, a lithium salt having an anion size having a widest diameter of less than 5 nm, and a photoinitiator to form a second solution;

mixing the first and second solutions to form a final solution;

applying the final solution to a substrate; and exposing the final solution to light irradiation to form a solid polymer electrolyte having an ionic conductivity of greater than $10^{-3}$ mS/cm at 70° C. and greater than $10^{-4}$ mS/cm at 25° C.

2. The method of claim 1, wherein the substrate is glass fiber.

3. A method of preparing an electrolyte composition comprising:

mixing an ethylene oxide monomer in an amount of 10 to 55% by weight of the composition and alkene monomer containing pendent functional groups having a relative permittivity of greater than 72 in an amount of 1 to 40% by weight of the composition to form a first solution;

mixing a plasticizer, a lithium salt having an anion size having a widest diameter of less than 5 nm, and a photoinitiator to form a second solution;

mixing the first and second solutions to form a final solution;

applying the final solution to a fibrous substrate having a thickness of less than 150 μm; and exposing the final solution to light irradiation to form a solid polymer electrolyte having an ionic conductivity of greater than $10^{-3}$ mS/cm at 70° C. and greater than $10^{-4}$ mS/cm at 25° C.

4. The method of claim 3, wherein the photoinitiator is phenyl bis(2,4,6-trimethylbenzoyl).

5. The method of claim 3, wherein the alkene monomer containing pendent functional groups is vinylene carbonate.

6. The method of claim 3, wherein the fibrous substrate has a thickness of less than 100 μm.

7. The method of claim 1, wherein the plasticizer is present in an amount of 20 to 50% by weight of the composition.

8. The method of claim 7, wherein the alkene monomer containing pendent functional groups having a relative permittivity of greater than 72 is present in an amount of 9 to 21% by weight of the composition.

9. The method of claim 3, wherein the ethylene oxide monomer is a poly(ethylene glycol) diacrylate.

10. The method of claim 9, wherein the pendent functional groups are cyclic carbonates.

11. The method of claim 10, wherein the plasticizer is succinonitrile.

12. The method of claim 11, wherein the lithium salt is lithium bis(trifluoromethanesulfonyl)imide.

13. The method of claim 12, wherein the fibrous substrate has a thickness of 25 to 100 μm.

14. The method of claim 3, wherein the solid polymer electrolyte comprises:

a polymer supported by the substrate, the polymer having ethylene oxide portions and hydrocarbon portions having carbonic acid groups, the ethylene oxide portions to hydrocarbon portions having a mass ratio from about 0.5 to 5:1;

the plasticizer distributed within the polymer; and lithium ions from the lithium salt distributed within the polymer and plasticizer.

15. The method of claim 14, wherein the carbonic acid groups are carbonic acid ester groups.

16. The method of claim 14, wherein the ethylene oxide portions are poly(ethylene glycol) diacrylate based.

17. The method of claim 16, wherein the hydrocarbon portions with carbonic acid groups are vinylene carbonate based.

18. The method of claim 17, wherein the substrate is a polymeric substrate.

19. The method of claim 18, wherein the polymeric substrate is expanded polytetrafluoroethylene.

* * * * *